United States Patent [19]
Kiebke

[11] Patent Number: 5,526,770
[45] Date of Patent: Jun. 18, 1996

[54] BIODEGRADABLE DUSTLESS CAT LITTER

[76] Inventor: Theodore M. Kiebke, Rt. 1 Box 276A, Detroit Lakes, Minn. 56501

[21] Appl. No.: 374,130

[22] Filed: Jan. 18, 1995

[51] Int. Cl.⁶ ..................................................... A01K 29/00
[52] U.S. Cl. ............................................................. 119/171
[58] Field of Search ................................... 119/171, 172, 119/173

[56] References Cited

U.S. PATENT DOCUMENTS

| | | | |
|---|---|---|---|
| 3,983,842 | 10/1976 | Marion et al. | 119/171 |
| 4,206,718 | 6/1980 | Brewer | 119/171 |
| 4,217,858 | 8/1980 | Dantoni | 119/171 |
| 4,341,180 | 7/1982 | Cortigene et al. | 119/171 |
| 4,519,340 | 5/1985 | Dickey | 119/171 |
| 4,571,389 | 2/1986 | Goodwin | 501/85 |
| 4,883,021 | 11/1989 | Ducharme et al. | 119/171 |
| 5,216,980 | 6/1993 | Kiebke | 119/173 |
| 5,361,719 | 11/1994 | Kiebke | 119/171 |

Primary Examiner—Thomas Price
Attorney, Agent, or Firm—D. L. Tschida

[57] ABSTRACT

A dustless cat litter including a wetting additive to agglomerate dust to litter ingredients and promote hydration. Exemplary wetting additives are water soluble, anionic, nonionic, amphoteric or synthetic surfactants, surfactant mixtures, soaps or synthetic detergents which are applied to the litter ingredients to bind dust and fines contained in the mixtures. A masking fragrance, neutralizer or attractant may be admixed with the surfactant. Exemplary hydrating cat litter or additive mixtures, which solidify upon contact with liquids to encapsulate pet waste matter, include a granulated base material (e.g. whole or coarse ground agricultural grains, pulse crops, clay granules or mixtures thereof), a gluten containing material (e.g. semolina or ground wheat) and may include sodium bicarbonate and/or a carrier bound fragrance. A quantity of surfactant on the order of ½ to 7 oz. per 10 pounds litter containing 5% to 10% fines is applied to the ingredients during blending of the mixture.

22 Claims, 4 Drawing Sheets

BIODEGRADABLE DUSTLESS CAT LITTER

BACKGROUND OF THE INVENTION

The present invention relates to cat litters and, in particular, to a biodegradable, scoopable cat litter which has been improved to be dustless.

Pet owners and particularly urban cat owners have numerous concerns pertaining to the care and maintenance of their pets. An ever present concern is collecting and disposing of animal wastes. A secondary concern is masking related odors, pending disposal.

For cat owners, the predominate mechanism for collecting and disposing of the wastes is a so called "cat litter". Typically, the cat litter is contained in a "litter box" that is placed about the residence of the pet owner and where the cat over time becomes accustomed to urinating and defecating. The liquids of the feces and urine are absorbed by the cat litter, which is periodically cleaned or discarded.

Commonly used litters provide a base material of clay, sand, gravel, sawdust or wood chips. Deodorants or masking scents are frequently added to the base material to mask any odor, pending collection. Such deodorizers can be added directly to the particulate or be impregnated into an absorbent carrier. Depending upon the aroma and, if the cat is being trained to use an odoriferous mixture, the cat may either accept or reject the litter.

Another litter is a so called "scoopable" litter. Such litters typically are comprised of a clay base and to which a deodorizer may be added, along with a hydrophilic material. The hydrophilic material reacts with the water in the urine and fecal matter to coalesce and produce clumps of litter where the animal has urinated or defecated. These clumps can be scooped from the container and disposed of along with any solid feces. A difficulty encountered with scoopable litters is that a relatively soft or fragile clump of waste matter is formed with the hydrophilic action.

With subsequent use of the container by the same or multiple cats, the cats frequently break and remix the clumped matter into the litter, unless the pet owner regularly cleans the litter box. With any re-mixing of the waste matter, the pet owner is faced with the same problems as with a non-scoopable litter. For example, should the cats have worms or other digestive tract parasites, any re-mixing of the waste matter re-releases the parasites, which can spread amongst the cats and even possibly to other pets.

Another difficulty is that cats tend to exhibit a preference for certain litters. Once trained to use one litter, a cat may reject another, even if offering improvements.

A further difficulty of clay based litters arises from disposal by pet owners into community sewer systems. That is, many pet owners flush the used litter or clumped fecal matter into their toilet. Because clay is not susceptible to decomposition, the particles can collect and obstruct the plumbing and sewage system conduits. The problem is of special concern in large municipalities or metropolitan areas. Preferably, all the litter ingredients should comprise materials which decompose in a relatively short time.

U.S. Pat. Nos. 5,216,980 and 5,361,719, which have issued to applicant, disclose litter additives and mixtures that have solved many of the foregoing difficulties.

Various pelletized, absorbent litters, using some similar ingredients to those of applicant, and related manufacturing processes are also described at U.S. Pat. Nos. 3,983,842; 4,206,718; 4,217,858; 4,341,180; 4,519,340; 4,571,389; 4,883,021; 5,100,600; Japan Patent No. 94,043; and European Patent No. 76,122.

In spite of the improvements provided by applicant's litter additives and mixtures, a problem common to all litters and shared by all manufacturers and pet owners is the dust or fines present in the litter mixtures. During mixing and packaging, air filtration equipment can be used to collect and filter the dust. Such measures are principally implemented to protect the workers. The mixture, however, is not treated to remove the dust present in the ingredients.

Once the packaged mixture is opened and dispensed into the litter box, the trapped dust is released into the pet owner's home. With normal agitation of the litter, during cleaning and use by the pet, the dust is continually released. Many pet owners have expressed displeasure over the lack of a dustless litter.

Accordingly, applicant has developed further improved, dustless litter and litter additive mixtures which produce relatively hard clumps of encapsulated animal waste that do not break up with continuing use of the litter by one or more cats. Desirably, the mixtures are dust free, the ingredients are biodegradable and present no health risks to the cat or pet owner, and promote hydration. The mixtures may include fragrances for masking or neutralizing odors and/or attracting the cat to minimize rejection of the litter.

SUMMARY OF THE INVENTION

It is accordingly a primary object of the present invention to provide a dustless, biodegradable mixture.

It is further object of the invention to provide a dustless, biodegradable cat litter mixture including a hydrophilic media, which encapsulates and produces a strong, stable clump upon exposure to urine and fecal matter.

It is a further object of the invention to provide a cat litter including a biodegradable, hydrating additive media having a relatively high gluten concentration and capable of permanently encapsulating animal waste, particularly urine, into a strong stable clump.

It is a further object of the invention to provide a cat litter including a dust inhibitor which agglomerates and binds any dust or fines in the mixture ingredients to larger ingredient particles without affecting the hydrating media.

It is a further object of the invention to apply an additive solution of an anionic, nonionic, amphoteric or synthetic surfactant, surfactant mixture, or a fatty acid based soap or detergent to the litter ingredients to bind dust and fines contained in the mixture.

It is a further object of the invention to admix a masking fragrance or neutralizer with the surfactant or carrier that is admixed with the litter.

It is a still further object of the invention to admix a fragrance having an attractant or "cat nip" quality to the surfactant or a carrier that is admixed with the litter.

It is a further object to suspend the hydrating media (e.g. a gluten containing material, such as semolina or ground wheat) in a base material (e.g. coarse ground agricultural grains, pulse crops, clay granules or mixtures thereof) and to coat the ingredients with a liquid anionic or nonionic surfactant.

Various of the foregoing objects and advantages are achieved in the biodegradable cat litter mixture of the present invention. In a presently preferred mixture, the active clumping ingredient comprises quantities of semolina ground to a 20 to 80 mesh.

The semolina is suspended in an organic, base material or mixture of base materials ground to an 8 to 80 mesh, for example, whole or coarse ground grains or pulse crops (e.g. wheat, corn, barley, rice, sunflower or beans) or by-products of agricultural processes (e.g. corn cob, orange peels, peanut shells, hulls, husks, wood) or shredded and dried matter (e.g. paper or grass). The mixture produces a scoopable, biodegradable litter which is capable of decomposition upon disposal.

A wetting additive or inhibitor comprising a 0.1% to 20% solution by weight of an anionic, nonionic, amphoteric or synthetic surfactant to water is applied to the litter mixture. The inhibitor also promotes hydration. The inhibitor is applied by injection at a concentration in the range of ½ oz. to 5 oz. per 10 lbs of litter mixture containing 2% to 10% fines. The inhibitor is a wetting agent that agglomerates dust and fines smaller than the ingredient nominal mesh size in the mixture to the larger particles. The inhibitor exhibits a viscosity in the range of 10 to 50 SAE.

Exemplary anionic surfactants are lauryl polyglucose, sodium laureth sulfate, TEA lauryl sulfate and sodium lauryl sulfate. Exemplary nonionic surfactants are a nonoxynol (1–10). Other inhibitors may comprise a fatty acid based material, such as a soap or synthetic detergent. Concentrations of other additives may be included to stabilize the inhibitor from mold etc. and promote shelf life of the litter.

A deodorizer, scent neutralizer, masking fragrance, attractant fragrance or mixtures thereof can be admixed with the inhibitor and a nonionic surfactant component to facilitate mixing. Quantities of sodium bicarbonate and/or a neutralizer/fragrance/attractant impregnated carrier, such as ground corn cob, may be added as desired. The litter composition is biodegradable and not harmful to the animal's health.

Still other objects, advantages and distinctions of the invention will become more apparent from the following description with respect to the appended drawings. Variously considered modifications and improvements are described as appropriate. The invention should not be strictly construed from the disclosure, but should be interpreted in view of the following appended claims.

DESCRIPTION OF THE PREFERRED EMBODIMENT

Figure 1:
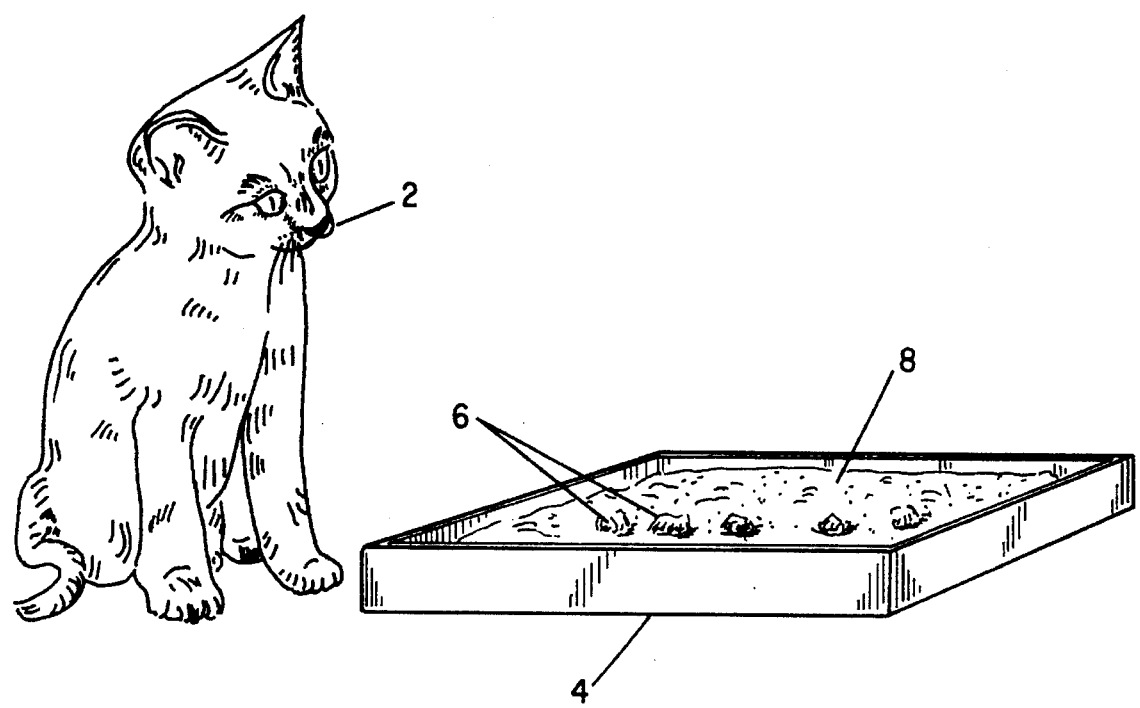
FIG. 1 is an isometric drawing showing a cat in relation to a typical litter box containing the inventive cat litter composition.

FIG. 1 depicts a cat 2 which is shown in relation to a typical "litter box" or container 4 for a cat litter 8. The container 4 can be of any construction or shape and is preferably liquid impermeable. The container 4 is normally sized in a range of 14 to 20 inches by 20 to 32 inches and provides a sidewall height sufficient to accommodate a minimal litter depth of two to four inches.

The volume of the container 8 is typically selected to contain a sufficient quantity of litter material to accommodate a preferred cleaning cycle established by the pet owner. Additional sidewall clearance is preferably provided to permit the cat 2 to cover the waste matter by pawing adjacent litter 8 over the waste, without undue spillage onto the surrounding floor.

The pawing and digging of the pet mechanically mixes the litter 8 to insure the production of strong, stable clumps of waste matter 6. The hardened clumps 6 are stable and readily removed with periodic cleaning and straining of the litter 8. The clumps 6 are preferably removed to a plastic bag and discarded with the household garbage.

U.S. Pat. Nos. 5,216,980 and 5,361,719 disclose litter mixtures and litter additives comprised of natural ingredients which produce stable clumps 6. The mixtures at U.S. Pat. No. 5,361,719 are particularly biodegradable.

Each litter mixture 8 preferably includes a gluten based active ingredient, such as semolina, which provides the desired clumping action. Unfortunately, such mixtures are disposed to containing quantities of fines or dust like particulates which are released to the pet owner's residence with the initial dispensing and subsequent agitation of the litter 8.

Advantageously, the litter mixtures 8 described below have been improved to permit the above agitation without releasing dust and trapped fines to the pet owner's residence. The mixtures 8 are also biodegradable, unless mixed with a clay based media.

Figure 2:
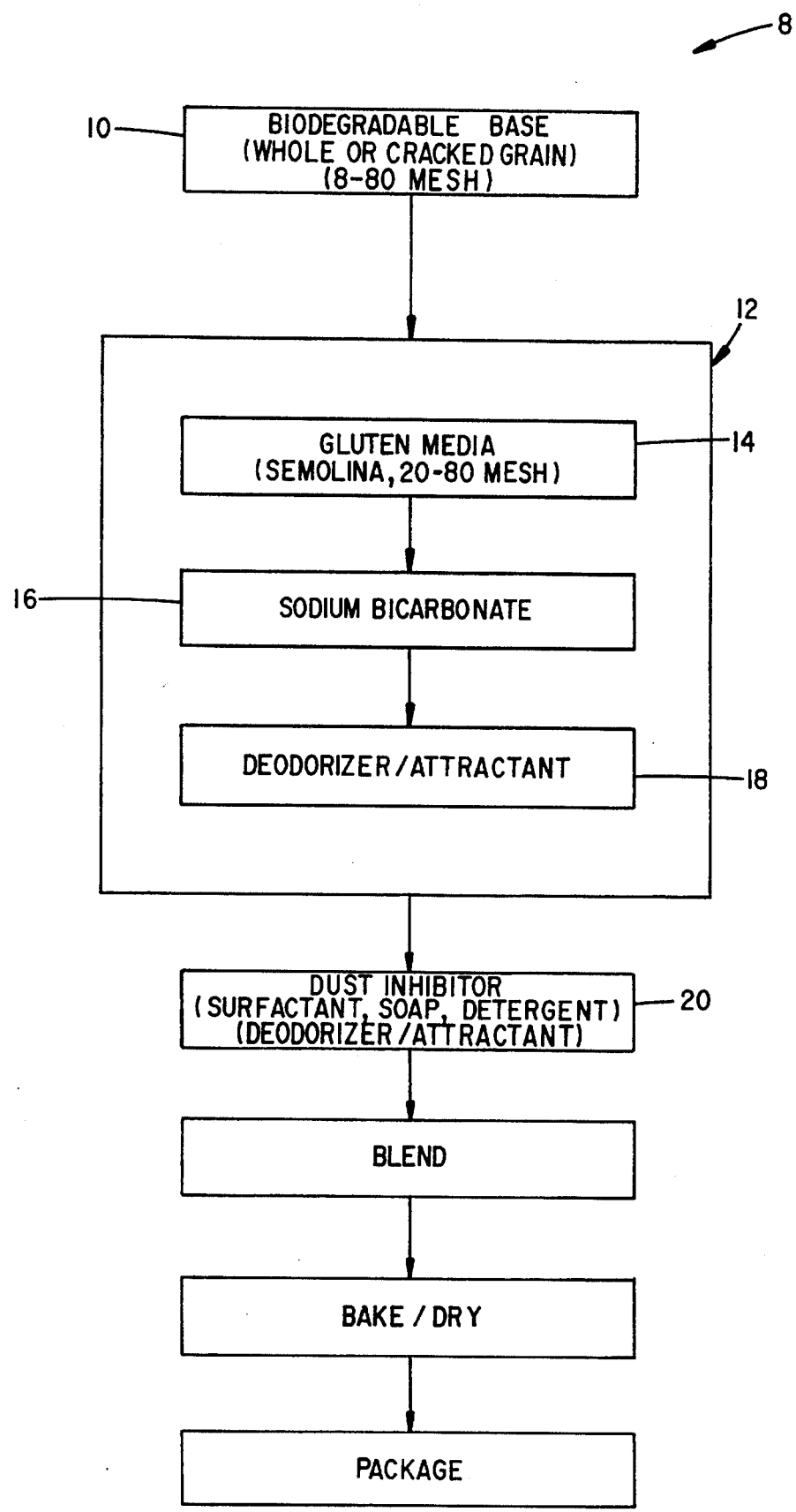
FIG. 2 shows a flow diagram for preparing the biodegradable cat litter of the invention.

With attention to FIG. 2, the base material 10 of the presently preferred and improved litters 8 comprise a liquid permeable, biodegradable material, selected from a number of organic materials. The decomposition period of the material 10 desirably should be relatively short. Economics also suggest that the material 10 should be available in quantity and at relatively low cost.

In preference to shredded paper, grass, wood chips, shavings and saw dust, the present mixtures 8 use agricultural crops as the base ingredient 10. For example, whole or coarse ground grains and pulse crops (e.g. durum wheat, hard red spring wheat, corn, barley, rice, sunflower and beans) are particularly preferred. Shredded or chopped and dried agriculture scraps, culls, or by-products (e.g. peanut shells, orange peelings, corn cob, alfalfa, flax and other grasses, husks and hulls, and recycled paper) may also be used. The foregoing materials may be used alone or in mixtures.

In a presently preferred litter mixture, the base material 10 comprises whole or cracked durum wheat, hard red spring wheat or corn. The base material 10 is sifted or separated to a particulate size in the range of 8 to 80 mesh. The base material 10 may include additives to prevent mold, kill bugs and generally treat the base 10 for other undesired attributes or organisms that might be occur in the base material 10. As desired, flea and tick killers may be added to the litter 8 to remove any contaminants that exist in the immediate surroundings of the litter box 4. The foregoing decontaminant materials may be added by the pet owner.

Mixed with the base material 10 is an additive or active hydrating composition 12. The additive 12 principally consists of a quantity of a gluten based media 14. Quantities of sodium bicarbonate or baking soda 16 and/or a neutralizer, deodorizer or attractant scent 18 can be added as desired.

A preferred gluten based media 14 comprises a wheat derivative. The gluten media 14 is sized to exhibit a particulate size and granular consistency that permits ready mixing with the base material 10 and also provides an aesthetically pleasing coloration, such as middlings of hard wheat, is preferred. Ideally, the gluten based media 14 should have a consistency to remain in suspension in the base material 10. For a base material 10 having a particulate size in the range of an 8 to 80 mesh (per grain processor industry standards), the gluten media 14 is processed to a size in a nominal range of a 20–80 mesh.

A preferred gluten media 14 is a hard wheat derivative (e.g. durum wheat), which is commonly used to make pasta, and which is sold under the common name of semolina. Semolina is more grainy than wheat flours and at the above mesh sizes tends to remain in suspension in the base particulate 10. An intermediate ground wheat or other gluten containing grain may also be used.

Although grains ground to a flour consistency provide desirable hydrophilic and adhesive or hydrating properties, they do not readily mix with the base material 10 and tend to settle to the bottom of the container 4. A flour ground grain can also contain bugs and become moldy over time, unless appropriate additives, discussed above, are included or added to the mixture 8.

By maintaining a homogeneous suspension of the gluten based media 14 within the base material 10, a faster acting hydration or coalescence is achieved with the animal waste matter. This action also prevents the liquid from seeping to the bottom of the container 4, where clumping and/or hardening to the container bottom can make it difficult to clean the container 4. Tests have shown relative concentration ratios in the range of 1 to 6 parts of base material 10 to 1 part semolina provide acceptable clumping at the litter 8. A 1:2 ratio or intermediate ratios provide faster clumping actions, but at greater cost.

A quantity of sodium bicarbonate or baking soda 16 may be added to the hydrating composition 12 to neutralize odors from the waste matter. A relative mixture range of sodium bicarbonate to semolina 14 might comprise 1% to 5% sodium bicarbonate to semolina. Settling of the ground bicarbonate is prevented by the semolina, which fills voids between the particles of base material 10.

The hydrating composition 12 may also include a quantity of fragrance. Fragrances preferably either neutralize any odors or provide a masking scent. If used, a corn cob carrier, such as ground corn cob pieces 18, can be impregnated with a biodegradable, digestible neutralizer or deodorizer. Presently, the corn cob pieces 18 are soaked in a liquid material sold under the trade name NILOSORB, which includes a desired fragrance oil. The NILOSORB is a water activated material which upon exposure to waste liquids, releases the bound fragrance to mask the waste odors.

The NILOSORB also has an inherent fragrance which acts like a "cat nip" or attractant and to which test animals have shown a definite preference. It is believed the cats are attracted to an amyl acetate oil base of the NILOSORB. Still other oils derived from mint plants can be added to the basic deodorizer or neutralizer 18. The deodorizer 18 is mixed with the semolina 14 at a concentration in the range of 1% to 5% impregnated corn cob to semolina 14.

The attractant qualities of the NILOSORB deodorizer also reduces the likelihood of rejection of the litter 8. In test cases, cats have shown a defined preference to litters improved with the active hydrating composition 12.

The active hydrating composition 12 is preferably premixed with the biodegradable base materials 10 discussed above. Less advantageously, the composition 12 can be mixed with a clay base 10. The composition 12 can also be added to other commercially available cat litters, whether or not of a scoopable variety and regardless of the base material, to provide an improved clumping action. The latter flexibility allows a pet owner to obtain an improved clumping litter, with less likelihood the cat will reject the litter.

The desired clumping action of the litter 8 is principally obtained from the gluten containing semolina 14. Within a liquid permeable grain base or a liquid impermeable clay base, the semolina 14 demonstrates a hydrophilic action to the liquid waste matter, which dominates over any absorption that occurs at the base 10 or any deodorant impregnated carrier. A liquid permeable base 14 desirably slows the migration of the waste liquids through the litter 8 and provides time for the liquids to react with the semolina 14. At the above relative concentration ratios of semolina 14 to base 10, clumping typically occurs within the first ½ to 1 inch of the litter 8.

Depending upon the type of base material 10, the relative rate of liquid migration through the litter 8 and absorption by the base 10 may vary, with the base 10 absorbing greater or lesser amounts of liquid. However, over time, the retained liquid is leached away by the semolina 14, even if initially, partially absorbed by the base material 10. Depending upon the amount of base material 10 encapsulated into the clumps 6, the quantity of litter 8 at the container 4 can be adjusted with each cleaning.

Depending also upon the cost and availability of the base ingredient 10, differing types of base materials 10 may be mixed. The relative concentrations of any base material mixture 10 should be adjusted to provide the above describe desired moisture retention and encapsulation. Although numerous base ingredients 10 have been suggested, it is to be appreciated many other materials can be substituted. The type of material may vary in relation to the locale where the litter 8 is prepared.

For a typical litter mixture 8, the gluten based composition 12 is added to the base 10 in a ratio of 30%–40% gluten composition 12 to 60%–70% by weight base 10. Presently preferred litters 8 contain on the order of 30%–40% by weight semolina to 60%–70% by weight ground wheat. The gluten composition 12 may be added in comparable concentrations to commercially available litters 8.

Upon exposure to liquids, the litter mixture 8 and commercial litters improved with the additive composition 12 have been shown to produce rock-hard clumps 6. For example, after approximately thirty minutes of exposure to liquid wastes, the clumps 6 can be broken only with great difficulty and especially not from subsequent use of the litter container 4 by the pet 2. Moreover, the clumps 6 encapsulate the waste matter, such that any parasites contained within the waste matter are less likely to be spread through the litter container 4 and distributed to other pets which may use the container 4.

A further improvement to the litter mixture 8 or additive composition mixture 12 is to apply a wetting additive or dust inhibitor 20 to the mixtures. For a litter 8, the inhibitor 20 is applied during the blending of the base 10, gluten media 14 and other desired additives, such as sodium bicarbonate 16 and/or the deodorizer 18. For an additive mixture 12, the inhibitor 20 is applied the same, although at concentration ratios near the lower end of the mentioned ranges, due to typically reduced concentrations of fines. Preferably, the inhibitor 20 should not initiate hydration of the gluten ingredient and only promote dust adhesion.

The dust inhibitor 20 is provided to remove dust or fines (i.e. particles smaller than 80 mesh) which pass through the sifting equipment that sizes the base 10 and gluten media 14. During mixing and packaging, the dust may be controlled with conventional dust collection and air handling equipment. However, steps have not previously been taken to reduce or control the dust at the packaged litter 8. A substantial portion of the dust is therefore retained in the packaged litter 8. Consequently, each time the litter 8 is dispensed or agitated, the dust is released to the pet owner's home.

The problem has been alleviated in the present invention with the addition of small quantities of inhibitor 20 which comprise a wetting additive. Exemplary additives are water soluble, anionic, nonionic, amphoteric or synthetic surfactants, surfactant mixtures, or fatty acid based soaps or synthetic detergents. The surfactant molecules provide hydrophobic sites which bond or agglomerate the dust and mixture particulates to each other. Free hydrophilic sites are available to attract moisture present in the animal waste admitted to the litter 8 and promote hydration at the gluten media 14.

Figure 3:
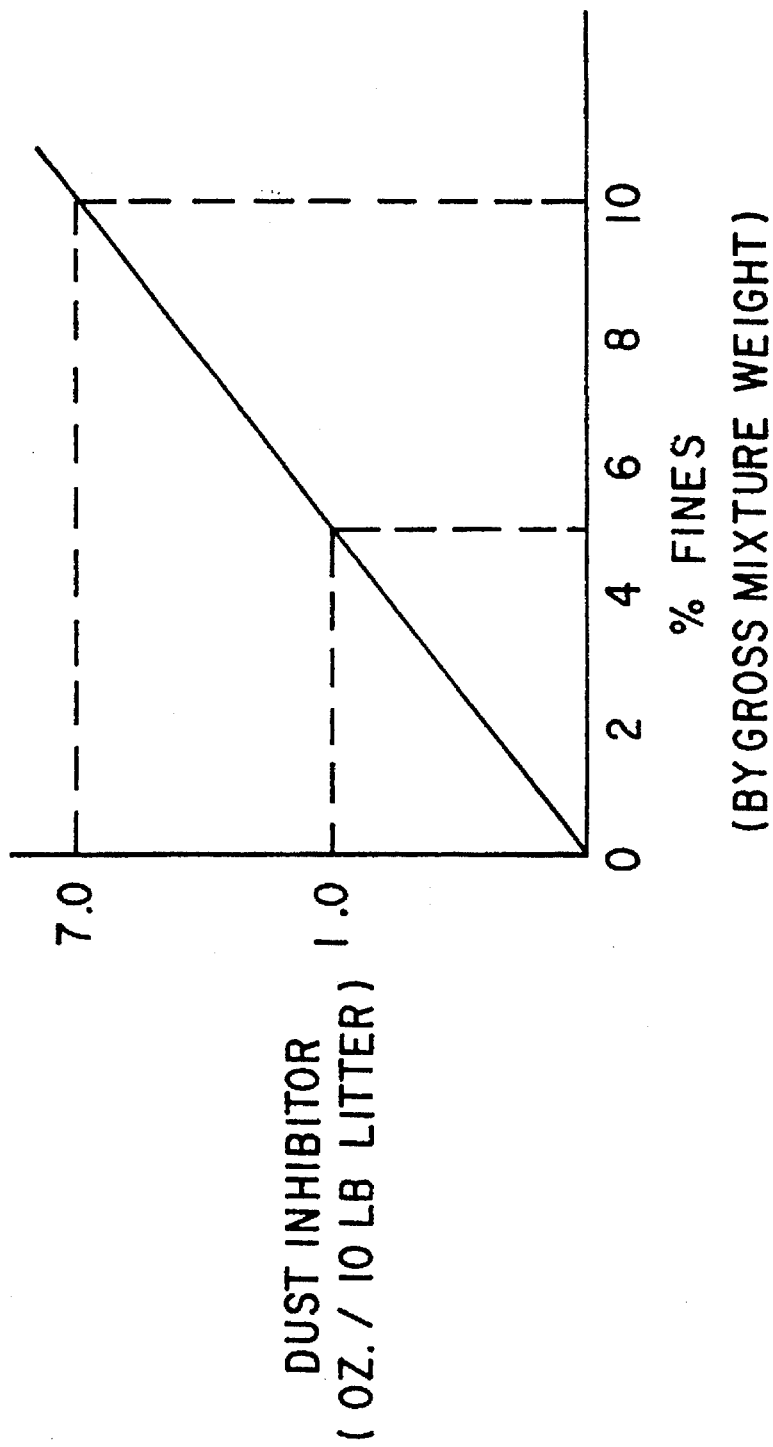
FIG. 3 shows a chart from which preferred concentrations of dust inhibitor can be derived.
Figure 4:
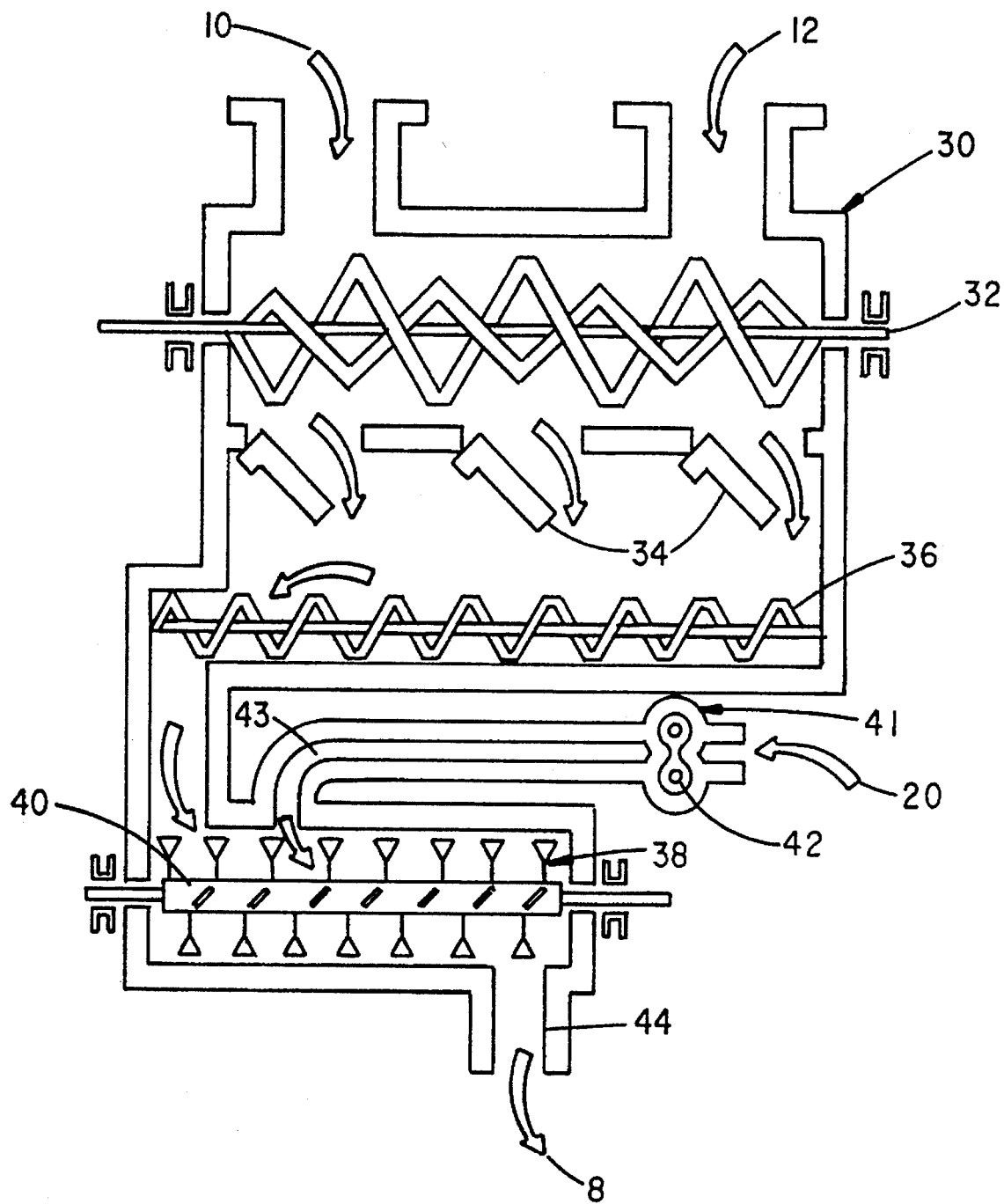
FIG. 4 shows a cross section view of apparatus used to admix and blend the litter ingredient mixtures of the invention.

With attention to FIGS. 3 and 4, and particularly FIG. 4, the inhibitor 20 is admixed with the litter ingredients to coat the individual particles as they are blended at a mixing station. The base 10 and gluten based composition 12 are admitted to a blender 30 and are initially blended at a ribbon auger 32. A controlled gating assembly 34 admits the initially blended base 10 and gluten based composition 12 to a conveyor auger 36 which directs the mixture to a coating chamber 38 having a paddle auger 40.

The inhibitor 20 is injected into the coating chamber 38 via a pressure pump 41 having a gating valve and a conduit 43. Alternatively, a suitable number of spray orifices (not shown) might be provided with another atomizing dispenser. The volume of inhibitor 20 is controlled to evenly coat the particulates and the contained fines. The inhibitor 20 is admitted to the chamber 38 as a foam, where the foam mixes and coalesces with the fines to trap and agglomerate the fines to the larger particulates in the litter 8 and maintain the granular consistency of the litter 8. The auger 40 blends the coated ingredients to facilitate bonding between the fines and larger particulates.

The speed of the augers 32, 36 and 38 are controlled to provide uniform coating and optimal agglomeration of the dust. Once the litter mixture 8 is dispensed at the outlet 44, an essentially dust free litter mixture 8 is obtained. A gluten based composition 12 used as an additive for commercial litters would be similarly mixed with the inhibitor 20, although at reduced concentrations of inhibitor 20.

Minimal hydration occurs at the gluten media due to the low moisture content of the inhibitor. However, as necessary, the litter 8 can be air dried or heated to an appropriate temperature (e.g. 100–300 degrees Fahrenheit) for a sufficient duration to remove any residual moisture from the inhibitor 20. At the present concentrations of inhibitor 20 heating has not proven necessary.

Presently preferred inhibitors 20 are a water diluted surfactant solution or a diluted liquid soap or synthetic detergent, which are preferred over oil based additives. Oil based additives tend to repel the liquid animal wastes and produce less efficient dispersal and absorption of the liquid waste. An alcohol dilutant might also be used.

The water content of the inhibitor 20 relative to the base 10 and hydration composition 12 is maintained to a relatively low concentration to prevent any reduction in the absorbancy of the litter 8 through premature hydration of the gluten media 14. The inhibitor 20 is also sparingly applied to the litter ingredients in the blending operation to prevent caking or stratification of the ingredients and maintain the desired granular consistency of the litter mixture 8.

A presently preferred inhibitor 20 is a 0.1% to 20% solution by weight of an anionic, nonionic, amphoteric or synthetic surfactant to water. The inhibitor is applied at a concentration in the range of ½ oz. to 7 oz. per 10 lbs of litter mixture 8 containing 2% to 10% fines. More typically, 3 to 5 oz. are used when an unfiltered or unwashed base 10 is used. The inhibitor concentration can be determined from FIG. 3. The inhibitor 20 exhibits a viscosity in the range of 10 to 50 SAE.

Exemplary anionic surfactants are lauryl polyglucose, sodium laureth sulfate, TEA lauryl sulfate and sodium lauryl sulfate. Exemplary nonionic surfactants are a nonoxynol (1–10). Various amphoteric or synthetic surfactants known to those skilled in the art may also be used, although are more costly.

Another inhibitor 20 that has been used to advantage is liquid soap, such as found in a variety of dish soaps and shampoos. For example, dilute concentrations of brand name soaps, such as IVORY dish soap and SUAVE shampoo, have been admixed with the litter 8. As necessary, the soap additive 20 is also diluted with small quantities of water or alcohol to a viscosity on the order of 10 to 50 SAE. The viscosity is determined to be compatible with the pressure pump 41.

The deodorizer and/or attractant 18 may also be injected into the litter 8 with the inhibitor 20 in lieu of being impregnated in a carrier, such as corn cob. In this instance, a suitable nonionic surfactant is included at the inhibitor 20 to promote mixing of the deodorizer 18. As necessary other additives may be included to promote a stable inhibitor 20. The foregoing deodorizers or a variety of other known deodorizers can be used to advantage. The deodorizer 18 may also be separately injected, although at present the deodorizer 18 is mixed and applied with the inhibitor 20.

The quantity of inhibitor 20 required is proportionately varied in relation to the amount or percentage by weight of fines present in the litter mixture 8. FIG. 3 depicts a graph from which particular concentrations of inhibitor 20 (i.e. surfactant or soap) to percentage fines can be determined. For example, for ten pounds of a litter 8 having approximately 5% fines by weight, one ounce of soap would be applied to contain the fines. As the percentage of fines increases, an appropriate, increased quantity of inhibitor 20 can be interpolated and applied.

Greater amounts of fines have been noted in litters 8 having a clay base material versus organic agricultural base materials, such as ground or cracked wheat. Consequently, correspondingly greater concentrations of inhibitor 20 are required when using a clay base 10 or material that is not pre or post cleaned. The concentration of fines can be reduced by washing or filtering the base materials as appropriate.

It is also to be appreciated the inhibitor 20 can be added to any type of available commercial litter. The inhibitor can also be added to a variety of non-food mixtures containing concentrations of problematic dust for a variety of applications.

The invention has been described with respect to various preferred biodegradable cat litter and litter additive mixtures which include a base material of organic agricultural materials and a gluten based additive composition including wheat middlings. The ingredients may be mixed to various combinations and concentrations and the litter mixtures may include other ingredients to facilitate pet use and promote useable life, storage life and clean-up. The base and gluten based material may also comprise the same material ground to different mesh sizes.

Various modifications and improvements thereto have also been suggested. It is to be appreciated, however, that still other equivalent compositions and mixtures may suggest themselves to those skilled in the art. The invention should therefore be interpreted to include all those equivalent compositions within the spirit and scope of the following claims.

What is claimed is:

1. A cat litter composition comprising:
   a) a granular base comprising a particulate sized in the range of a 8 to 80 mesh;
   b) a granular, gluten containing media, wherein the granularity of the gluten media is selected to upon mixing with the base provide a substantially homogeneous suspension of the gluten media within a quantity of said base; and
   c) a wetting additive applied to said base and gluten media to agglomerate dust and fines contained in said base and gluten media with said base and gluten media, wherein said wetting additive promotes attraction of liquid animal waste to said gluten media, and wherein said litter composition reacts in the presence of liquid containing animal waste to bind the animal waste into hardened, biodegradable clumps of animal waste, base and gluten media.

2. A cat litter composition as set forth in claim 1 wherein said wetting additive is selected from a class including anionic, nonionic, amphoteric or synthetic surfactants; soap; or synthetic detergents.

3. A cat litter composition as set forth in claim 2 wherein said anionic surfactants are selected from a class containing lauryl polyglucose, sodium laureth sulfate, TEA lauryl sulfate and sodium lauryl sulfate.

4. A cat litter composition as set forth in claim 2 wherein said nonionic surfactant is selected from a class including nonoxynol 1–10.

5. A cat litter composition as set forth in claim 2 wherein said wetting additive includes a liquid deodorizer.

6. A cat litter composition as set forth in claim 5 wherein said wetting additive includes a liquid animal attractant scent.

7. A cat litter composition as set forth in claim 1 wherein said wetting additive is applied in a 0.1% to 20% solution by weight of wetting additive to water, and wherein the additive is applied at a concentration in the range of ½ oz. to 7 oz. per 10 lbs of litter mixture.

8. A cat litter composition as set forth in claim 1 wherein said base comprises cracked wheat.

9. A cat litter composition as set forth in claim 8 wherein said gluten containing media comprises middlings of hard wheat.

10. A cat litter composition as set forth in claim 9 wherein said hard wheat comprises durum wheat.

11. A cat litter composition as set forth in claim 1 wherein said gluten containing media is sized in the range of a 20 to 80 mesh.

12. A cat litter composition as set forth in claim 1 wherein said base comprises an agricultural material selected from a class including whole or coarse ground wheat, rice, barley, corn, beans, rice, sunflower, beans, oats, and flax.

13. A cat litter composition as set forth in claim 12 wherein the class of base materials includes clay and by-products of agricultural processing including hulls, husks, shells, peels, and cobs.

14. A cat litter composition as set forth in claim 1 including a deodorizer.

15. A cat litter composition comprising:
    a) a granular agricultural grain base particulate sized in the range of an 8 to 80 mesh; and
    b) ground wheat middlings sized in the range of a 20 to 80 mesh, wherein the wheat mixed with the base to a substantially homogeneous suspension;
    c) a surfactant applied to said base and wheat to agglomerate dust and fines contained in said base and wheat, wherein said surfactant promotes attraction of liquid animal waste to said wheat, and wherein said litter composition reacts in the presence of liquid containing animal waste to bind the animal waste into hardened, biodegradable clumps of animal waste, base and wheat.

16. A cat litter composition as set forth in claim 15 wherein said surfactant is selected from a class including anionic, nonionic, amphoteric and synthetic surfactants or mixtures thereof.

17. A cat litter composition as set forth in claim 16 wherein said anionic surfactants are selected from a class containing lauryl polyglucose, sodium laureth sulfate, TEA lauryl sulfate and sodium lauryl sulfate.

18. A cat litter composition as set forth in claim 16 wherein said nonionic surfactants is selected from a class including nonoxynol 1–10.

19. A cat litter composition as set forth in claim 15 wherein said surfactant includes a liquid deodorizer.

20. A cat litter composition as set forth in claim 15 wherein said surfactant is applied in a 0.1% to 20% solution by weight of surfactant to water, and wherein the surfactant solution is applied at a concentration in the range of ½ oz. to 7 oz. per 10 lbs of litter mixture 8 containing 2% to 10% fines.

21. A cat litter composition comprising:
    a) a granular base particulate comprising hard wheat sized in the range of an 8 to 80 mesh; and
    b) wheat middlings sized in the range of a 20 to 80 mesh, wherein the wheat middlings are mixed with the base to a substantially homogeneous suspension;
    c) an anionic surfactant solution of 0.1% to 20% solution by weight of surfactant to water, wherein said surfactant is selected from a class containing lauryl polyglucose, sodium laureth sulfate, TEA lauryl sulfate and sodium lauryl sulfate applied to said base and gluten media to agglomerate dust and fines with said base and gluten media, wherein the surfactant solution includes a deodorizer, wherein the surfactant solution is applied at a concentration in the range of ½ oz. to 7 oz. per 10 lbs of litter mixture, and wherein said litter composition reacts in the presence of liquid containing animal waste to bind the animal waste into hardened, biodegradable clumps of animal waste, base and wheat middlings.

22. A cat litter composition comprising:
    a) a granular base, and a granular, gluten containing media, wherein the granularity of the gluten media is selected to upon mixing with the base provide a substantially homogeneous suspension of the gluten media within a quantity of said base; and
    b) a wetting additive applied to said base and gluten media to agglomerate dust and fines contained in said base and gluten media, wherein said wetting additive promotes attraction of liquid animal waste to said gluten media, and wherein said litter composition reacts in the presence of liquid containing animal waste to bind the animal waste into hardened, biodegradable clumps of animal waste, base and gluten media.

* * * * *